(12) United States Patent
Herrmann (10) Patent No.: US 10,695,242 B2
(45) Date of Patent: Jun. 30, 2020

(54) ADAPTIVE ATTACHMENT WHEEL FOR WHEELCHAIRS

(71) Applicant: Vosara UG, Kirchehrenbach (DE)

(72) Inventor: Dominik Herrmann, Wiesenttal (DE)

(73) Assignee: Vosara UG, Kirchehrenbach (DE)

( * ) Notice: Subject to any disclaimer, the term of this patent is extended or adjusted under 35 U.S.C. 154(b) by 110 days.

(21) Appl. No.: 15/769,966

(22) PCT Filed: Oct. 17, 2016

(86) PCT No.: PCT/EP2016/001712
§ 371 (c)(1),
(2) Date: Apr. 20, 2018

(87) PCT Pub. No.: WO2017/067650
PCT Pub. Date: Apr. 27, 2017

(65) Prior Publication Data
US 2018/0318157 A1   Nov. 8, 2018

(30) Foreign Application Priority Data

Oct. 22, 2015   (EP) ........................................ 5003022

(51) Int. Cl.
*A61G 5/10*   (2006.01)
*A61G 5/06*   (2006.01)
(Continued)

(52) U.S. Cl.
CPC ............ *A61G 5/1083* (2016.11); *A61G 5/003* (2013.01); *A61G 5/02* (2013.01); *A61G 5/06* (2013.01);
(Continued)

(58) Field of Classification Search
CPC ........ A61G 5/1083; A61G 5/003; A61G 5/06; B62K 21/08
See application file for complete search history.

(56) References Cited

U.S. PATENT DOCUMENTS

| 528,874 | A | * | 11/1894 | Hall | ........................ | B62K 21/08 |
| | | | | | | 280/272 |
| 583,130 | A | * | 5/1897 | Smith | ..................... | B62K 21/08 |
| | | | | | | 280/272 |

(Continued)

FOREIGN PATENT DOCUMENTS

| DE | 4107410 C2 | 10/1999 |
| DE | 20007793 U1 | 9/2000 |

(Continued)

*Primary Examiner* — Kevin Hurley
(74) *Attorney, Agent, or Firm* — Murphy, Bilak & Homiller, PLLC (57) ABSTRACT

The invention relates to an adaptive attachment wheel for wheelchairs, formed as a unit consisting of: a wheel (5); frame segments (1); adaptation shells (7, 8) for lateral guidance on the wheelchair front tubes; and at least one holding element (6) that can be fastened to the wheelchair; such that, when the adaptive attachment wheel is attached to the wheel-chair, the adaptation shells (7, 8) are brought together with the wheelchair front tubes, the front casters of which are lifted off of the ground, and a three-wheeled wheelchair is produced, the front wheel (5) of which can be steered and braked by means of an one-hand steering system (13).

18 Claims, 10 Drawing Sheets

(51) Int. Cl.
*A61G 5/02* (2006.01)
*A61G 5/00* (2006.01)
*B62K 21/08* (2006.01)
*A61G 5/08* (2006.01)

(52) U.S. Cl.
CPC .......... *A61G 5/1051* (2016.11); *A61G 5/0875* (2016.11); *A61G 5/1008* (2013.01); *A61G 5/1016* (2013.01); *A61G 5/1035* (2013.01); *A61G 5/1056* (2013.01); *A61G 5/1089* (2016.11); *B62K 21/08* (2013.01)

(56) References Cited

U.S. PATENT DOCUMENTS

| | | | |
|---|---|---|---|
| 2,191,663 A * | 2/1940 | Hussy | B62K 21/08 280/279 |
| 3,921,740 A * | 11/1975 | Forster | A61G 3/061 180/213 |
| 7,011,324 B2 * | 3/2006 | Salonia | B62K 21/08 188/26 |
| 7,976,049 B2 * | 7/2011 | Chiu | A61G 5/047 180/13 |
| 8,651,507 B2 * | 2/2014 | Kylstra | A61G 5/10 280/250.1 |
| 8,684,113 B1 * | 4/2014 | Laconis | A61G 5/047 180/11 |
| 9,056,035 B2 * | 6/2015 | Ju | A61G 5/027 |
| 9,326,901 B2 * | 5/2016 | Conte | A61G 5/047 |
| 2008/0115982 A1 * | 5/2008 | Lin | A61G 5/047 180/13 |
| 2008/0315549 A1 | 12/2008 | Dougherty | |
| 2013/0009382 A1 | 1/2013 | Hay | |
| 2018/0140486 A1 * | 5/2018 | Klein | A61G 5/047 |

FOREIGN PATENT DOCUMENTS

| | | |
|---|---|---|
| DE | 10102855 C1 | 7/2002 |
| DE | 10028338 02 | 3/2003 |
| DE | 102007014533 B3 | 7/2008 |
| EP | 0911010 A2 | 4/1999 |
| FR | 2841462 A1 | 1/2004 |
| FR | 2882253 A1 | 8/2006 |

* cited by examiner

ADAPTIVE ATTACHMENT WHEEL FOR WHEELCHAIRS

The invention relates to a detachable adaptive attachment wheel supposed to expand the range of use of the wheelchair otherwise limited greatly. It comprises an unit consisting of an attachment wheel, frame segments and at least one holding element fastened to the wheelchair such that when attaching the adaptive attachment wheel to the wheelchair its front casters are lifted off of the ground and a three-wheeled wheelchair is produced.

Wheelchair attachment wheels with foldable frames are already known, which are fastened by means of mechanical holding elements, and others with rigid frames with which the fastening is achieved by means of a plug connection. In addition, there are wheelchair bicycles capable of being fastened to the wheelchair without any attachment parts, e.g. by means of screwable clamping jaws.

Such embodiments are well known from:
DE 10 2007 014 533 B3,
DE 100 28 338 C2,
DE 101 02 855 C1,
DE 200 07 793 U1,
DE 41 07 410 C2,
EP 0911 010 A2.

According to prior art so far, for wheelchair users it is difficult to attach or transport the usually heavy and big configurations with steering systems and brakes autonomously.

However, smaller configurations solving this handling problem don't have active driving facilities such as e.g. brake and steering system, thereby making driving difficult and unsafe. Furthermore, heavy and space-consuming attachment parts at the wheelchair are often necessary by which its handling is aggravated in daily use.

The invention has the objective to provide an adaptive attachment wheel of the above mentioned type such that the wheelchair user can easily and autonomously attach and furthermore effortlessly transport it. Additionally, driving on poorly conditioned routes is supposed to be facilitated. The drive power ought to remain unchanged by direct, non-retarded steering for being able to cope with laterally inclined pathways with as little effort as possible so that no drive power has to be applied for steering. Thus, the tendency of the wheelchair to align towards downhill is expected to be prevented. During downhill driving much fraction between the hands and the gripping rings is produced with conventional decelerating the wheelchair resulting in a fast temperature rise of the palms and requiring much effort. A calliper brake located at the front wheel solves this problem and is additionally intended to be combinable with the conventional deceleration.

Furthermore, the preconditions for a high-grade adaptability to the needs of the user and to the differently configured types of wheelchair frames are supposed to exist. The holding elements attached to the wheelchair are to be configured in a form as small and light-weighted as possible.

This means that a product is to be formed by this new attachment wheel, the wheelchair user can transport with his car completely autonomously and independently of other persons, can attach it easily and thus can drive on different pathways (for example on trails, grassland, sand, gravel, uphill, down-hill, inclined routes) actively, safely and without any assistance of a steering system and a brake.

These objectives are achieved by the features specified in the claims.

Prior to the attachment of the adaptive attachment wheel to the wheelchair the holding elements are clamped to its wheel-chair front tubes in equal heights. In order to achieve the functional position, the front wheel resting on the ground is firstly inserted into the holding elements with the upper adaptation shells. By means of the tensioning element to be put around the wheelchair front tubes, now the lower adaptation shells of the frame segments are brought together with the wheelchair front tubes by means of a tensioning mechanism wherein the casters of the wheelchair lift off of the ground.

It is advantageous to configure the holding elements as a two-part ring with a groove into which the upper adaptation shells can be inserted and engage to ensure a backlash-free and sustainable connection between the wheelchair and the attachment wheel as well as to facilitate the assembly and the attachment.

Advantageously, the tensioning elements to be put around the wheelchair frame are provided with a soft surface to avoid damages to the wheelchair frame.

Advantageously, the tensioning mechanism for tensioning the tensioning elements is provided with a locking feature preventing an autonomous release of the fastening.

Advantageously, the adaptation shells are configured in a rotatable and swivelling manner to achieve the adaptability to different wheelchair frame types and the parallelism of both vertical joints as a geometrical condition for performing the lifting function by means of a tensioning mechanism.

Advantageously, the inner dimension of the adaptation shells having a soft surface are adaptable to the outer dimension of the wheelchair front tubes.

Advantageously, two frame segments are present which can be swivelled symmetrically horizontally by rotating joints at the steering tube to enable the adaptation to different frame widths and to keep the packing size small.

Advantageously, the frame segment has a telescopically adjustable inner holm with an offset to the end of which an adaptation shell is fastened to enable the adaptation to different frame types.

Advantageously, the contact point of the wheel is positioned behind the intersection point of the extended steering axis and the ground.

Advantageously, the steering system has an adjustable sluggishness as well as an additional mid position to guarantee the tracking stability. This is particularly advantageous with the two-handed propelling of the wheelchair because a tail wag of the front wheel is prevented on poorly conditioned routes.

Advantageously, the handlebar with a brake is designed for the one-hand operation as well as performed adjustable in height and length for physical adaptability.

In the following, the invention is described in more details on the basis of the embodiment shown in the drawings. However, it should here be clarified that it is an exemplary embodiment variations of which are possible within the scope of the claims.

Figure 1:
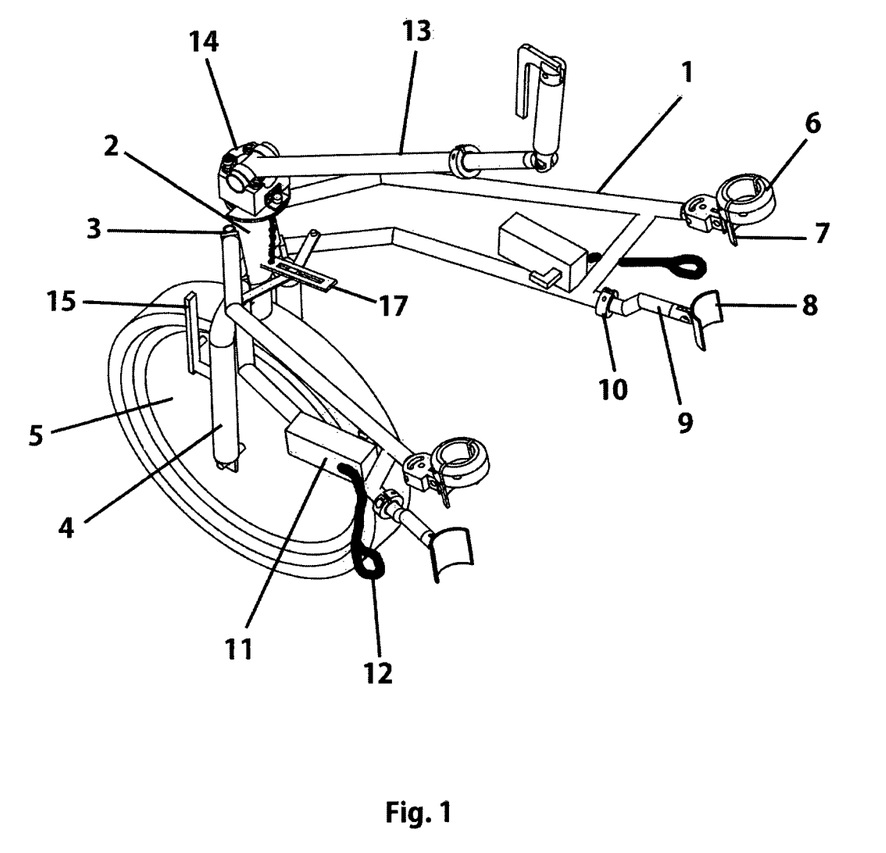
FIG. 1 shows a general view of an exemplary embodiment of the attachment wheel adaptation according to the invention.
Figure 3:
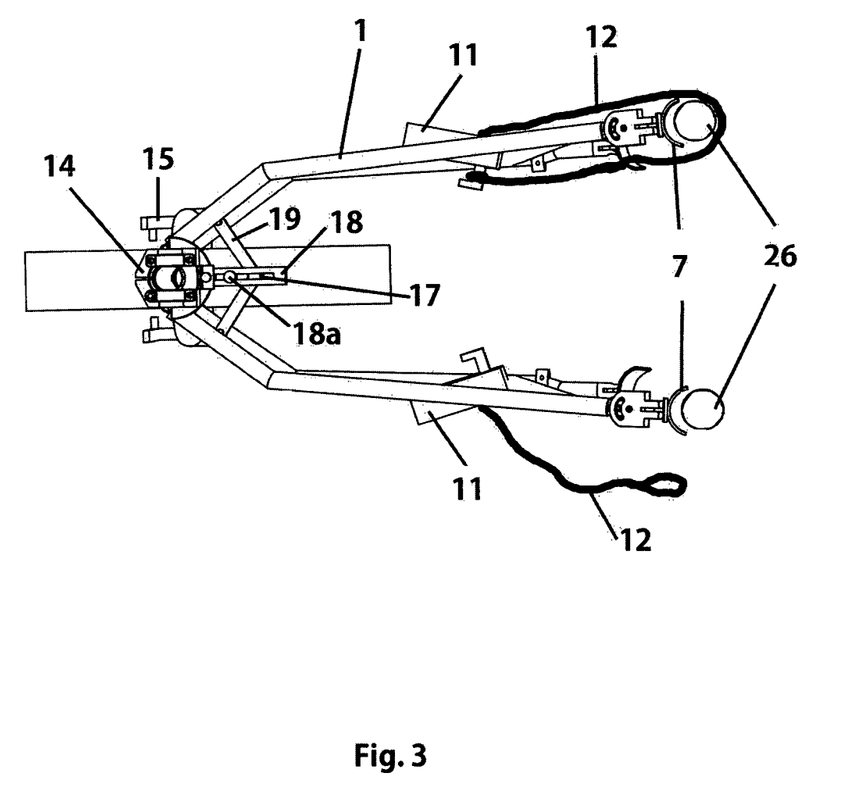
FIG. 3 shows a plan view of the unit without a handlebar.
Figure 6:
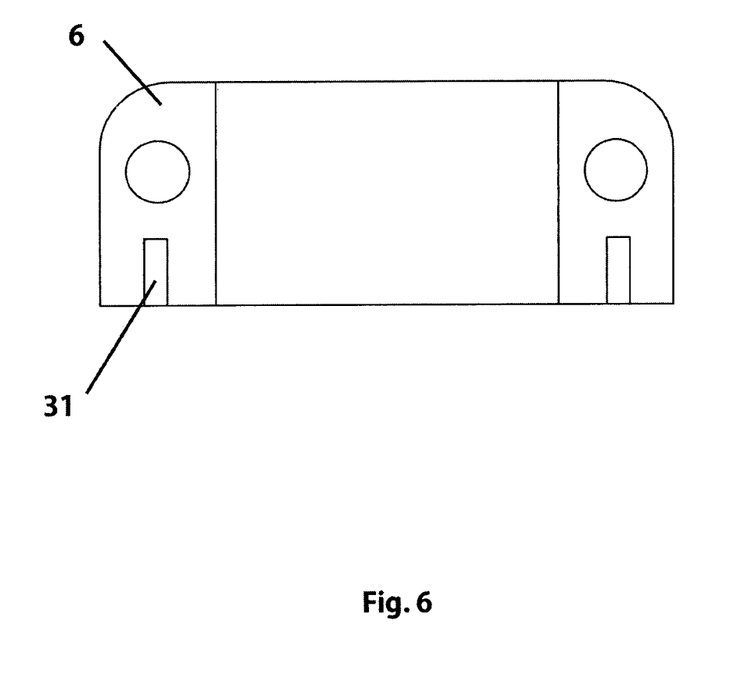
FIG. 6 shows a cross-sectional view of an adaptation ring.
Figure 7:
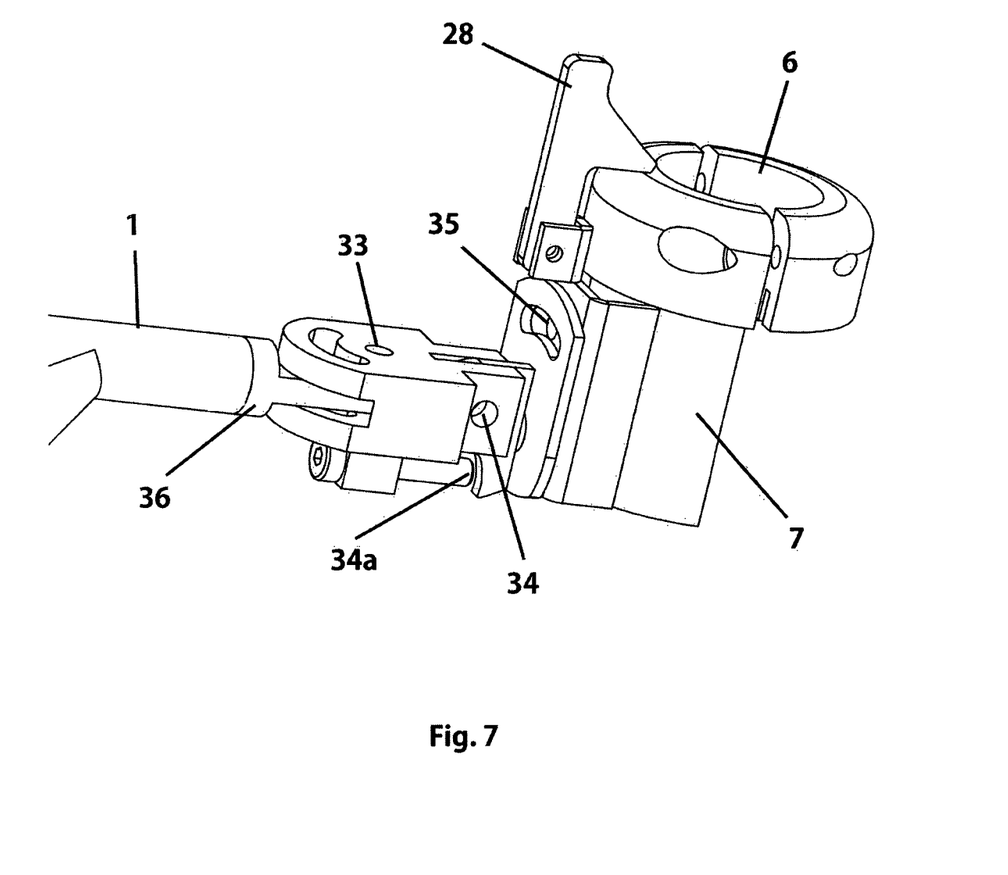
FIG. 7 shows a perspective view of the upper adaptation shells with joints.
Figure 10:
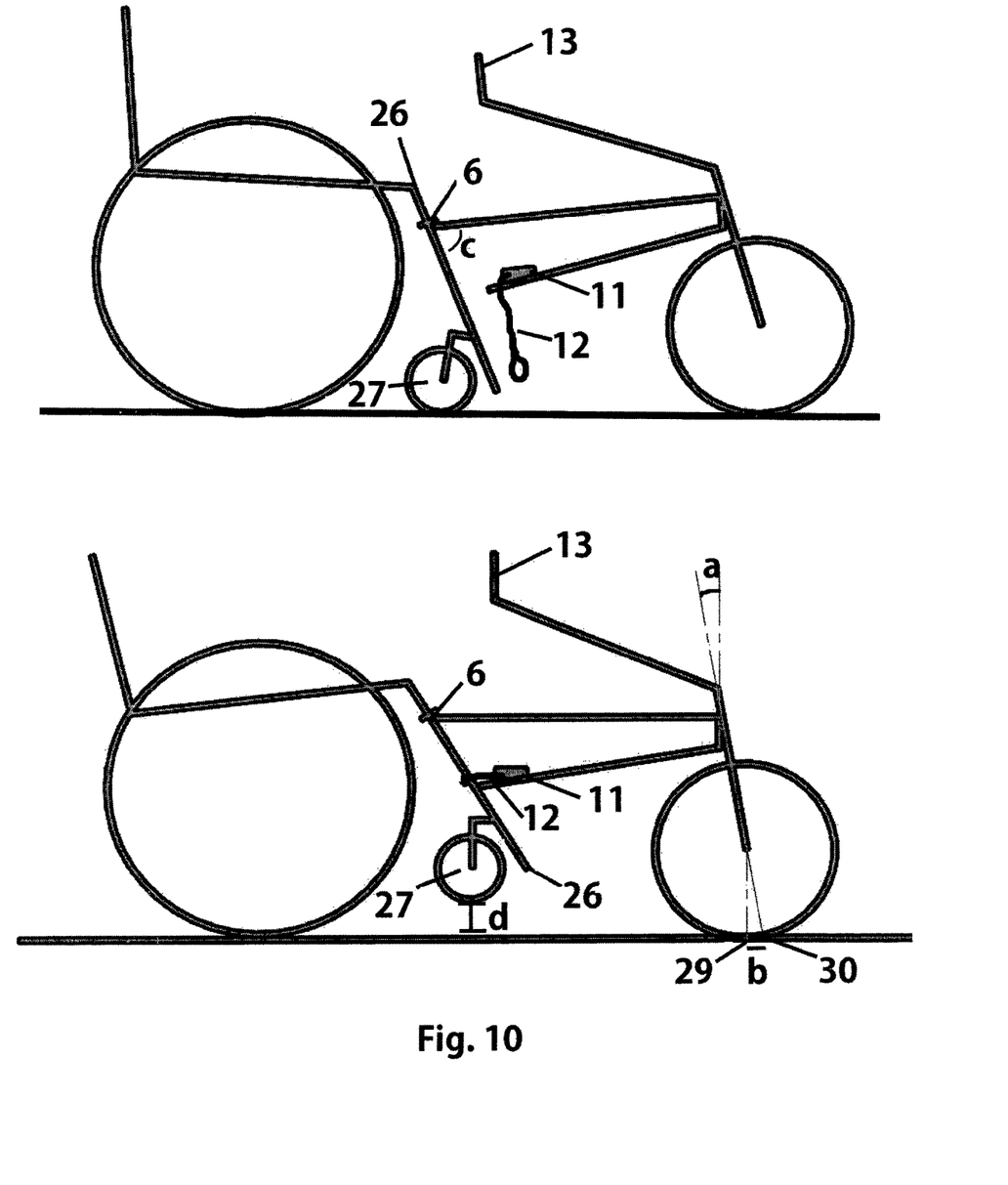
FIG. 10 shows the initial and end/functional position during fastening the attachment wheel adaptation to the wheelchair in a side view.

The embodiment (FIG. 1) consists of one left and one right frame segment (1) fastened to the steering tube (2) by means of joints (3). In connection with the lockable shearing mechanism (17, 18, 19; FIG. 3) a symmetric triangle frame continuously adjustable in width for different widths of wheelchair seats results. In order to guarantee a maximum adaptability each of the upper adaptation shells (7) is connected with the respective frame segment (1) by a horizontal joint (33; FIG. 7), a vertical joint (34) and a rotating joint (35). The adaptation rings (6) are clamped to the wheelchair front tubes (26; FIG. 10) in the upper section at the same height. Further modifications of the wheelchair are not required. The upper adaptation shell (7) comprises a hook (28; FIG. 7) engaging the adaptation ring (6; FIG. 1 and FIG. 6) during inserting the adaptation shell into it such that the attachment wheel is fixed at the wheelchair and hereby facilitating the further adaptation procedure.

Figure 8:
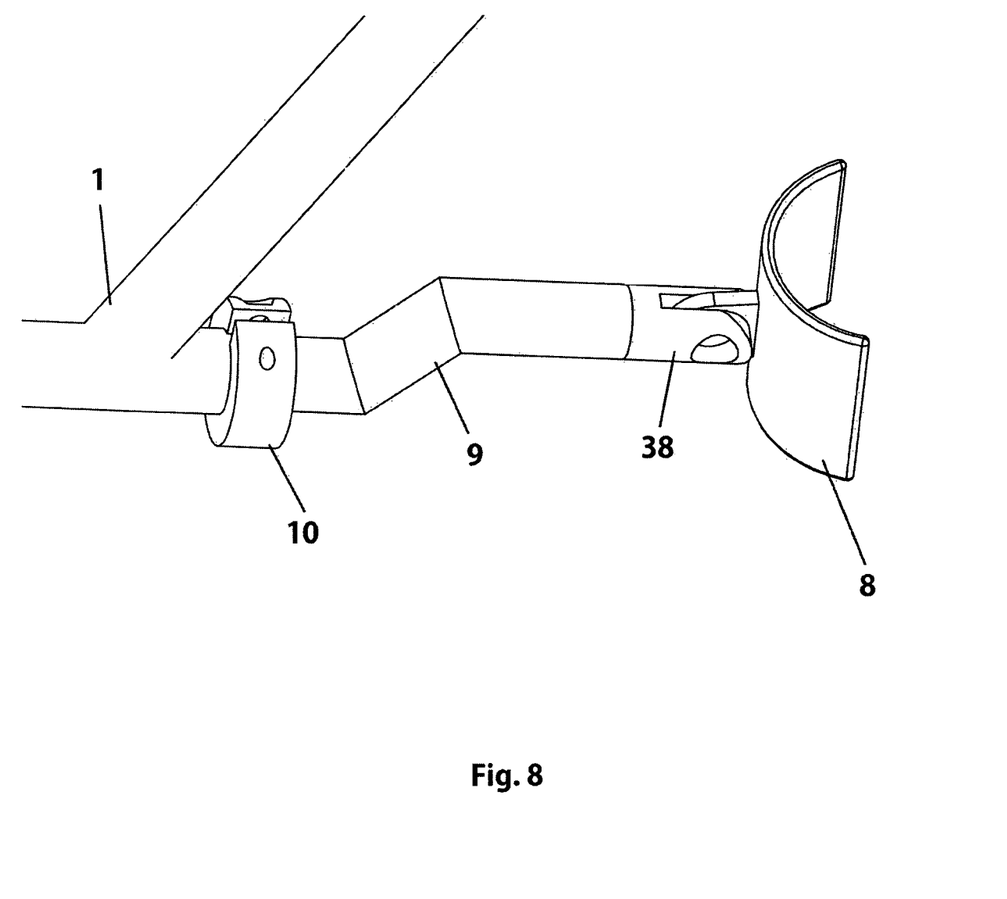
FIG. 8 shows a perspective view of the lower adaptation shells with joints.

The lower adaptation shells (8; FIG. 8) are rotatably connected with the offset tubes (9) which are guided in the lower tube of the frame segment (1) as an inner tube in a telescopically adjustable and rotatable manner and can be locked by a clamping (10). This adjustability enables an adaptation of the attachment frame to wheelchairs with different front tube angles as well as to special variants as, for example, adduction frames.

At each frame segment (1) a tensioning mechanism (11) is located having a tensioning element of textile belt with a loop (12) at the end which is hung up at the frame segment (1). To achieve the functional position (FIG. 10, below), the upper adaptation shells (7) are inserted into the grooves of the adaptation rings (31; FIG. 6), the tensioning elements (12) fastened to the tensioning mechanisms (11) are led around the wheelchair front tubes (26; FIG. 3, 10), hung up at the frame segments (1) and tensioned by means of the tensioning mechanism (11). During this procedure the lower adaptation shells (8) are approaching the wheelchair front tubes (26; FIG. 10) up to form-fit whereby the casters of the wheelchair are lifted off of the ground (d; FIG. 10).

Figure 4:
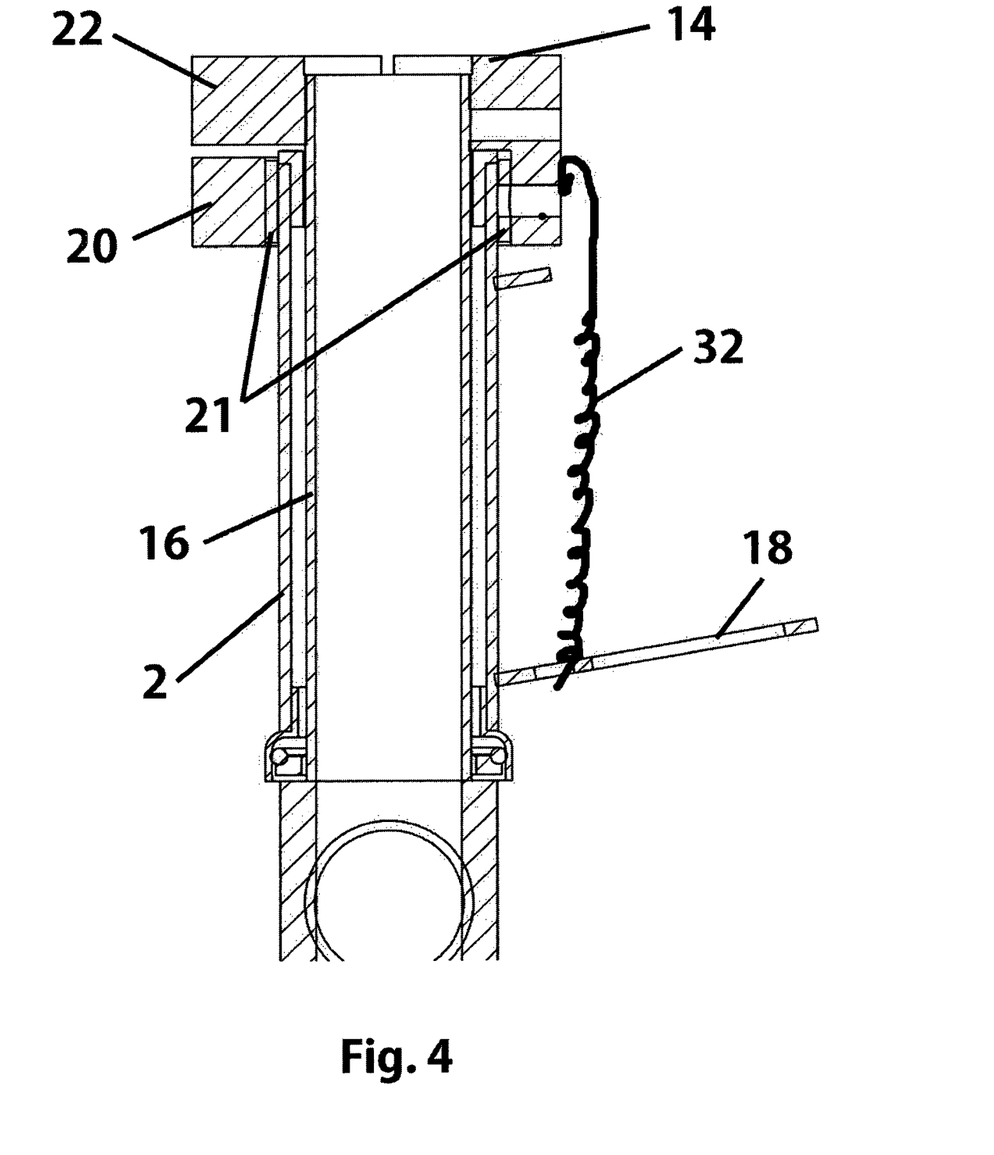
FIG. 4 shows a cross-sectional view of a steering tube and a handlebar stem.
Figure 9:
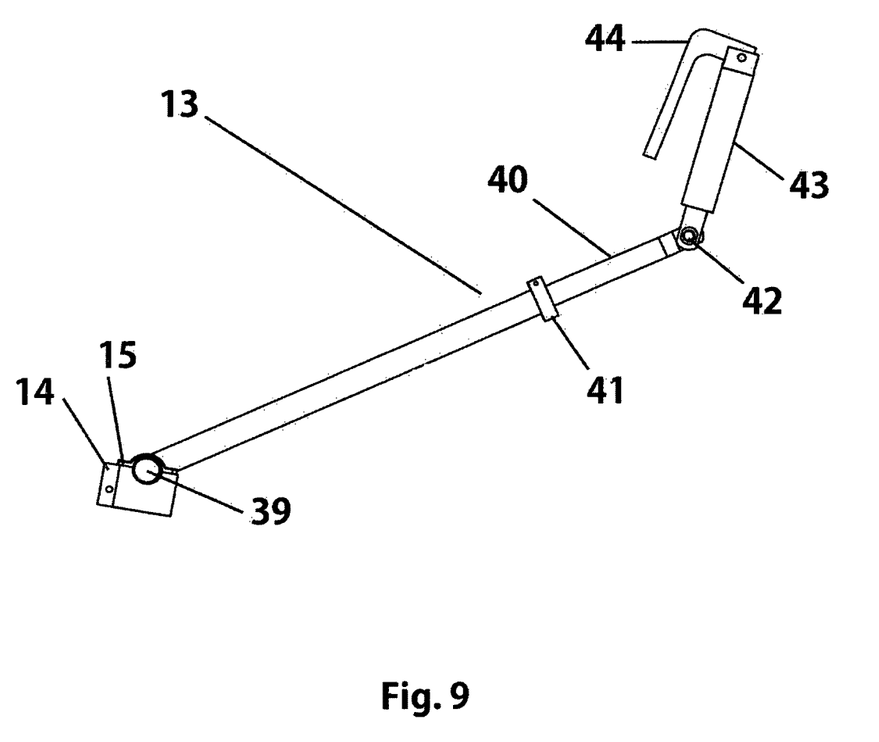
FIG. 9 shows side views of the one-hand handlebar.

The attachment wheel (FIG. 1) has a brakeable and steerable wheel (5) equipped with an one-handed operable steering system (13, FIG. 9) with a brake (44, FIG. 9). This steering system is characterized by two lockable joints (39, 42; FIG. 9) for an angle adjustment and a telescopic mechanism. (40, 41; FIG. 9) for length adjustment. By this features a maximum adaptability of the steering and braking operation to the user is achieved. At its lower half the handlebar stem (14, FIG. 4) is provided with a friction ring (21; FIG. 4) which can be pressed against the outer surface of the steering tube (2) by means of an adjustment clamp (20) thereby forming an adjustable steering resistance. A spring (32) fixed between the handlebar stem (14) and the steering tube (2) provides for a spring-centred straight running of the front wheel. Furthermore, a limitation of the steering angle is obtained by two stops (24) at the steering tube and one at the handlebar stem (14). In addition the front wheel has a straight wheel fork (4) and a steering angle (a; FIG. 10) causing that the wheel contact point (29; FIG. 10) is positioned in driving direction behind the intersection point (30; FIG. 10) of the extended steering axis and the ground.

Figure 5:
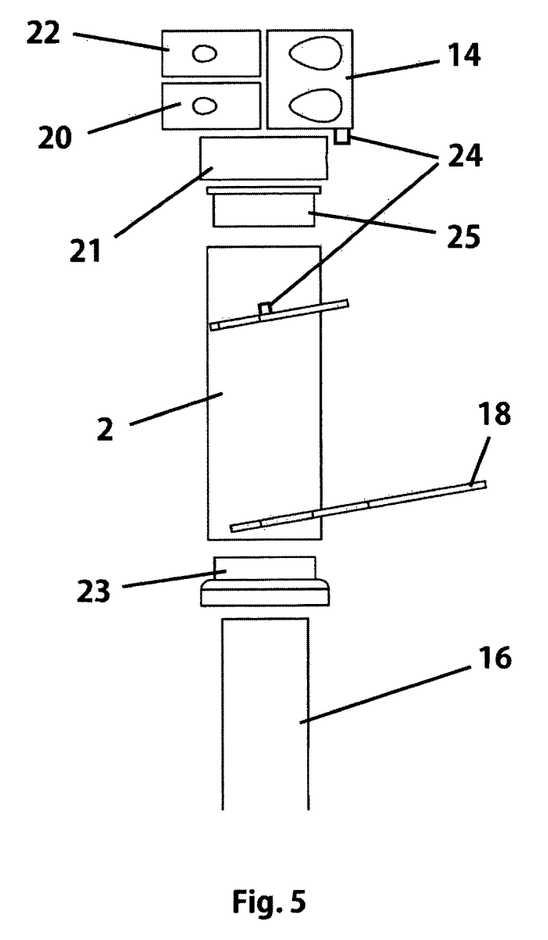
FIG. 5 shows an exploded view of the steering tube and the handlebar stem.

The features of a spring-centred straight running and a steering resistance (32, 20; FIG. 5), together with the above mentioned positive trail (b; FIG. 10), bring about a stabilized straight running and a steering behaviour familiar to the wheelchair user during two-handed propelling of the unit through the gripping rings of the wheelchair. The front wheel (5; FIG. 1) can directly and comfortably be steered and braked through the one-hand operation (13; FIG. 1) in driving down-hill and along curves. These features enhance the driving safety, reduce the required effort and enable a more efficient movement. The triangle frame with lockable shearing mechanism (17, 18, 19; FIG. 3) and adjustable adaptation shells (FIG. 7, FIG. 8) results in an extremely adaptive frame structure still having a high stiffness. After an one-time setting (18*a*; FIG. 3; 33, 35, 34*a*; FIG. 7) there is the advantage of performing a fast change between transport mode and functional mode of the attachment wheel and thus of its fast and flexible handling This embodiment is of high benefit for wheelchair users as it solves essential handling problems and thus effects a mobility benefit not yet known.

REFERENCE LIST

Figure 2:
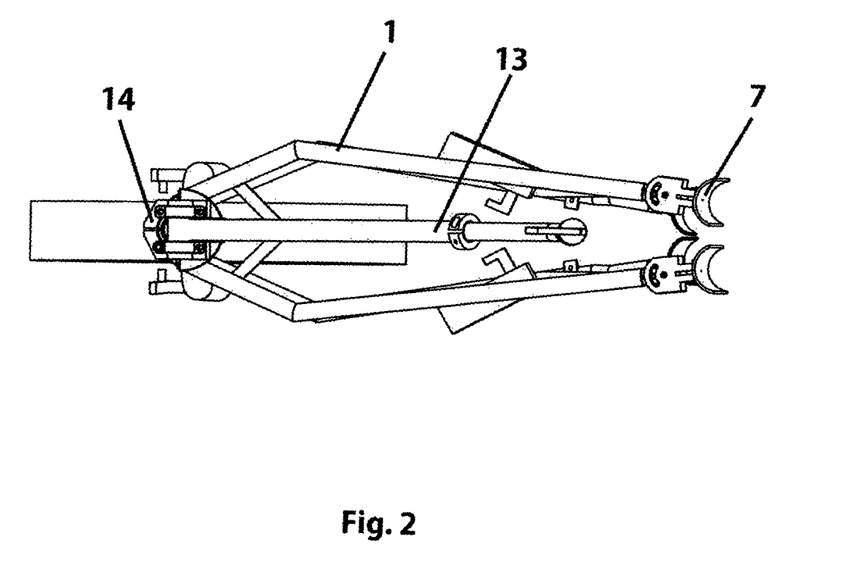
FIG. 2 shows a plan view of the attachment wheel adaptation shown in FIG. 1 in packing size.

FIG. 1: Perspective General View "Attachment Wheel Adaption with Adaption Ring"
 1 frame segment
 2 steering tube
 3 rotating joint of steering tube
 4 wheel fork
 5 wheel
 6 adaptation ring
 7 upper adaptation shell
 8 lower adaptation shell
 9 tube offset
 10 clamping tube offset
 11 tensioning mechanism
 12 tensioning element with loop
 13 one-hand handlebar
 14 handlebar stem
 15 V brake
 17 shearing mechanism
FIG. 2: Plan View "Unit in Packing Size"
 1 frame segment
 7 upper adaptation shell
 13 one-hand handlebar
 14 handlebar stem
FIG. 3: Plan View "Unit without Handlebar"
 1 frame segment
 7 upper adaptation shell
 11 tensioning mechanism
 12 tensioning element with loop
 14 handlebar stem
 15 V brake
 17 shearing mechanism
 18 shearing mechanism guide rail
 18*a* shearing mechanism fixable lock retainer
 19 shearing mechanism arm
 26 wheelchair front tube
FIG. 4: Cross-sectional view "Handlebar Stem and Steering Tube"
 2 steering tube
 14 handlebar stem
 16 fork shaft
 18 shearing mechanism guide rail
 20 adjustment clamp steering resistance
 21 friction ring 22 fork shaft clamp
32 return spring
FIG. 5: Exploded View "Handlebar Stem and Steering Tube"
2 steering tube
14 handlebar stem
20 adjustment clamp steering resistance
21 friction ring
22 fork shaft clamping
23 lower bearing shell
24 steering stop
25 slide bearing steering tube
FIG. 6: Cross-sectional View "Adaption Ring"
6 adaptation ring
31 groove for adaptation shells
FIG. 7: Perspective View "Upper Adaption Shell with Joints"plus "Adaption Ring"
1 frame segment
6 adaptation ring
7 upper adaptation shell
28 hook
33 lockable horizontal joint
34 vertical joint
34a swivel range limitation vertical joint
35 lockable rotating joint
36 connector
FIG. 8: Perspective View "Lower Adaption Shell with Joints"
1 frame segment
8 lower adaptation shell
9 tube offset
10 clamping tube offset
38 rotatable joint connector
FIG. 9: Side View "One-hand Handlebar"
13 one-hand handlebar
14 handlebar stem
39 handlebar height adjustment
40 telescopic tube
41 telescopic tube clamping
42 lockable grip joint
43 grip
44 brake lever
FIG. 10: Diagram "Adaption Procedure"
6 adaptation ring
11 tensioning mechanism
12 tensioning element
13 one-hand handlebar
26 wheelchair front tube
27 casters
29 wheel contact point
30 intersection point of extended steering axis with ground
a steering tube angle
b trail
c tensioning angle
d casters' lift off

The invention claimed is:

1. An adaptive attachment wheel for fastening to a wheelchair, wherein the attachment wheel, in a fixed state on the wheelchair, is configured to lift off front wheels of the wheelchair such that a three-wheeled wheelchair is produced, the attachment wheel comprising:
a wheel attached to a wheel fork;
at least one tensioning element configured to tension the adaptive attachment wheel to a front tube of the wheelchair and to effect lifting of the front wheels of the wheelchair;
at least one frame segment; and
a steering tube connected to the frame segment,
wherein a fork shaft of the wheel fork is guided within the steering tube, the fork shaft being rotatably supported in the steering tube,
wherein the wheel can be steered by a one-hand handlebar being in operative connection with the wheel fork,
wherein a rotary resistance of the one-hand handlebar relative to the steering tube is adjustable by a friction device.

2. The adaptive attachment wheel of claim 1, wherein the friction device comprises a clamping device with a friction element, and wherein the friction element is configured to be pressed against the steering tube.

3. The adaptive attachment wheel of claim 2, wherein the friction element further comprises a friction ring, and wherein the friction ring is configured to be pressed against an outer surface of the steering tube by the clamping device.

4. The adaptive attachment wheel of claim 1, wherein the one-hand handlebar is adjustable in height and/or adjustable in length.

5. The adaptive attachment wheel of claim 1, wherein the one-hand handlebar comprises a telescope tube connected to a handlebar stem by a first joint, and wherein an end-sided grip is fastened to the telescope tube by a second joint.

6. The adaptive attachment wheel of claim 5, wherein the first joint and the second joint are lockable in respective angle positions.

7. The adaptive attachment wheel of claim 1, wherein a spring element is fastened to a handlebar stem and the steering tube, and wherein the spring element is configured to move the wheel in a mid-position in which a straight running of the wheel is enabled.

8. The adaptive attachment wheel of claim 7, wherein the friction device is configured to be set such that the wheel is locked in the mid-position.

9. The adaptive attachment wheel of claim 1, wherein the handlebar stem comprises a steering stop.

10. The adaptive attachment wheel of claim 1, wherein the adaptive attachment wheel is configured, in a state mounted to the wheelchair, to form a positive trail of the wheel between a wheel contact point of the wheel and a track point set by an angle of the steering tube such that the wheel trails a steering rotational axis in a driving direction.

11. The adaptive attachment wheel of claim 1, wherein the fork shaft is rotatably supported in the steering tube by a handlebar stem configured to be clamped or by a threaded steering set.

12. The adaptive attachment wheel of claim 1, wherein the wheel is configured to be braked by the one-hand handlebar.

13. A three-wheeled wheelchair formed by a wheelchair and the adaptive attachment wheel of claim 1 fastened to the wheelchair.

14. Three-wheeled wheelchair of claim 13, wherein a positive trail of the wheel is formed between a wheel contact point of the wheel and a track point set by an angle of the steering tube such that the wheel trails a steering rotational axis in a driving direction.

15. An apparatus, comprising:
an adaptive attachment wheel configured to be fastened to a wheelchair; and
holding elements for fastening to different wheelchair frames,
wherein the adaptive attachment wheel, in a fixed state on the wheelchair, is configured to lift off front wheels of the wheelchair such that a three-wheeled wheelchair is produced, wherein the adaptive attachment wheel comprises:
  a wheel attached to a wheel fork;
  at least one of frame segment; and
  a steering tube connected to the frame segment,
wherein a fork shaft of the wheel fork is guided within the steering tube, the fork shaft being rotatably supported in the steering tube,
wherein the wheel is configured to be steered by a one-hand handlebar being in operative connection with the wheel fork,
wherein a rotary resistance of the one-hand handlebar relative to the steering tube is adjustable by a friction device.

16. The apparatus of claim 15, wherein the adaptive attachment wheel comprises two frame segments which are fastened to the steering tube by respective first ends and to at least three adaption shells by respective second ends, wherein an opening of each adaptation shell is directed away from the second end of the frame segment, wherein at least one adaption ring configured for attachment to the wheelchair front tube is provided which includes a groove configured to the shape of one of the adaption shells for inserting the adaption shell, wherein at least one of the further adaption shells is configured to be tensioned to the wheelchair front tube by at least one tensioning element attached to one of the two frame segments, and
  wherein a lateral guidance is created at the wheelchair front tube by a shape of a further adaption shell.

17. A three-wheeled wheelchair formed by a wheelchair and the apparatus of claim 16, wherein the adaptive attachment wheel is fastened to the wheelchair.

18. The three-wheeled wheelchair of claim 17, wherein a positive trail of the wheel is formed between a wheel contact point of the wheel and a track point set by an angle of the steering tube such that the wheel trails a steering rotational axis in a driving direction.

* * * * *